Oct. 24, 1944.   B. BAER   2,361,005
HAND PLANTER
Filed Oct. 24, 1941
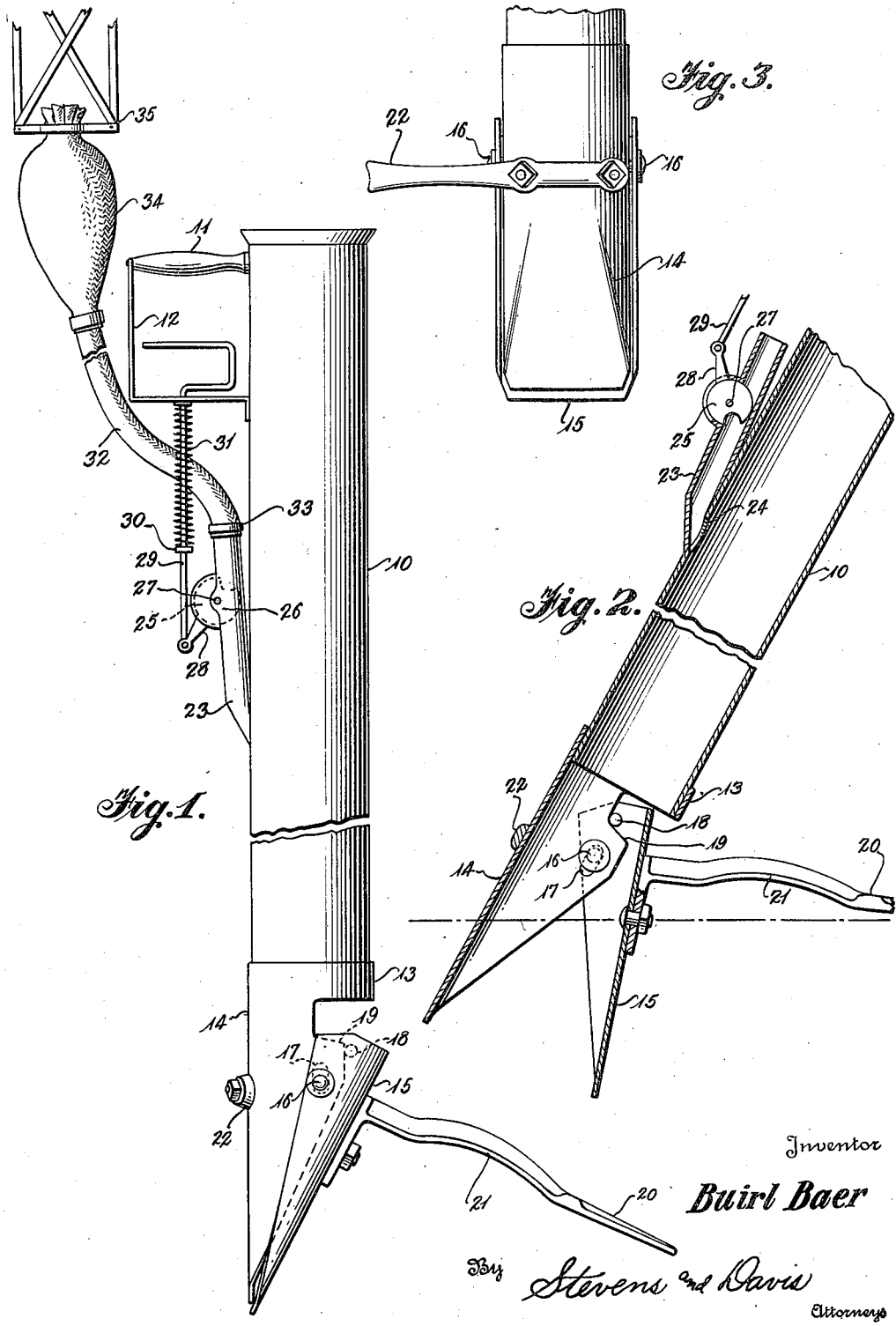
Inventor
Buirl Baer
By Stevens and Davis
Attorneys Patented Oct. 24, 1944

2,361,005

UNITED STATES PATENT OFFICE 2,361,005

HAND PLANTER

Buirl Baer, Whittaker, Mich.

Application October 24, 1941, Serial No. 416,403

1 Claim. (Cl. 111—92)

This invention relates to portable hand-operated seed planters, and is more particularly concerned with a planter of this type in which fertilizer is supplied to the soil concurrently with the planting of the seed.

For many years, portable hand-operated seed planters have been widely used. Generally speaking, such devices consist of a seed chute or hopper provided at one end with means, such as a shovel, for opening the soil and dispensing seed beneath the surface thereof. Ordinarily, the chute or hopper is provided with a handle so that the operator may carry the device and may jab the shovel portion into the cultivated soil. Once the soil has been penetrated, some means is actuated for releasing the seed. After this is done, the shovel is removed from the soil and the operator proceeds to the next planting location.

From the foregoing outline, it can be seen that seed planters of the hand type are of simple construction and may be operated with such ease as to render them susceptible to a wide-spread use. Despite this fact, it is frequently found desirable to inject into the soil at the time of planting a dry fertilizer of any commercial type and the conventional hand planter in unmodified form is wholly lacking in facilities for performing this function.

It has been proposed to effect the application of fertilizer to the soil concurrently with the injection of the seed therein by the use of a number of expedients including: manually dispensing fertilizer in the soil while the shovel of the planter is in position, the application of the fertilizer being a separate operation; admixing fertilizer with the seed in the hopper, and providing the portable planter with an additional hopper adapted to contain fertilizer. Each of these expedients is open to objection. If the fertilizer is applied separately from the injection of the shovel of the planter in the soil, the soil enriching material will be disposed near the surface of the soil at a point substantially above the seed and, consequently, above the level of the roots which will ultimately spring therefrom. This is inefficient from the standpoint of plant nourishment and further objectionable because a fertilizer dispenser of some type must be separately carried by the operator.

Admixture of the fertilizer with the seed is equally unsatisfactory. The grain sizes of the seed and fertilizer, as well as their relative weights, are such that the amount of fertilizer per seed is subject to wide variation with incident burning of some portions of the planted area while other portions remain unfertilized.

Probably the best of the proposals heretofore made for the introducion of fertilizer to the soil concurrently with the planting of seed therein is the scheme which involves the use of a separate hopper attached to the hand planter. This arrangement generally results in a satisfactory introduction of fertilizer into the soil, but the provision of an additional hopper renders the planting device so cumbersome and so heavy as to preclude its wide-spread use, operator fatigue being a serious item.

It is, therefore, an object of this invention to overcome all of the foregoing disadvantages and to provide for the concurrent planting of seeds and distribution of fertilizer adjacent the same in a manner which is both convenient for the operator and satisfactory from the plant husbandry standpoint.

According to this invention, it is contemplated that seeds may be disposed beneath the surface of soil by the use of a hand-operated portable planting device while fertilizer may be discharged either above or below the seeds as the particular agricultural exigency may require.

It is an object of this invention to provide for the association of a hand planter and a fertilizer dispenser in such a way that the weight of fertilizer may be readily borne by the operator while the dispensing of both the seeds and the fertilizer may be expeditiously accomplished.

It is a further object of this invention to provide an economical, easily constructed seed planter and fertilizer applicator, the dispensing functions and transportation of which may be effected by the use of but a single hand of the operator.

Other objects and advantages of this invention will be apparent upon consideration of the following detailed description of a preferred embodiment thereof in conjunction with the annexed drawing, wherein:

Figure 1 is a view in side elevation of a preferred form of a hand planting device with fertilizer attachment constructed according to this invention;

Figure 2 is a vertical sectional view of the lower portion of the planter shown in Figure 1 illustrating the manner of opening the seed chute while the shovel is in the ground; and Figure 3 is a fragmentary view in elevation showing the foot step used in inserting the shovel in the ground.

The hand planter illustrated in the drawing consists of a seed chute 10 provided at its upper end with a lifting handle 11 which is reinforced by an angle-iron 12 extending from the end of the handle to the surface of the chute below the point of attachment of the handle. The end of the seed chute 10 remote from the point of attachment of handle 11 constitutes a discharge opening. An annular collar 13 surrounds this opening and a shovel 14, having a sharpened point for insertion in the soil, depends therefrom in registry with the opening. Pivoted to shovel 14 is a closing plate 15. Closing plate 15 is provided with round openings on either side and bolts at 16 are passed through these openings and through elongated registering slots 17 in shovel 14. Thus, in addition to pivotal movement, closing plate 15 is likewise vertically movable with respect to shovel 14. This movement is of importance in connection with interior studs 18 on closing plate 15 adapted for use with a shoulder 19 of shovel 14. Thus, in the position of Figure 1, studs 18 lock shovel 14 and closing plate 15 against pivotal movement about bolts 16. Hence, if the receptacle defined between shovel 14 and closing plate 15 is charged with seeds or fertilizer, accidental discharge cannot occur. Closing plate 15 is provided with an outwardly extending ground surface contacting member 20, a portion 21 of which is arcuate. Extending from shovel 14 at a point about 90° away from member 20 is a foot step 22 which is used by the operator in inserting shovel 14 into the soil. This step, although shown as extending from the left side of the apparatus, may, if deemed convenient, be disposed on the right side for operation by the other foot.

About midway of the seed chute 10 a conduit 23 is attached thereto, this conduit leading into the seed chute through an aperture at 24. Feed chute 23 is provided with a measuring valve 25 adapted to control the amount of material passed through the conduit and hence into the seed chute. Valve 25 is mounted between plates 26 and is arranged for pivotal movement about a pin 27. Valve 25 is provided with a shank portion 28 to which is pivotally connected a rod 29 which extends upwardly through an aperture in the lower shank of angle-iron 12, the configuration of the rod 29 above the point of passage through said shank of angle-iron 12 being that of a reversed C so that the end of the rod lies parallel, gripping handle 11. Intermediate the lower arm of angle-iron 12 and the point of attachment to arm 28, rod 29 is provided with a nut 30. Between nut 30 and the lower arm of angle-iron 12 a coil spring 31 is provided, this spring normally acting on nut 30 to bias the measuring valve to the position shown in Figure 1. The portion of rod 29 which extends parallel to handle 11, however, may be gripped by the hand of the operator and drawn toward handle 11. This causes rod 29 to move vertically upward to bias measuring valve 25 to the position of Figure 2. The measuring valve is filled with material to be discharged through a flexible conduit 32 attached by ring 33 to the end of conduit 23 remote from the point of discharge 24. The other end of flexible conduit 32 is connected to a fertilizer sack 34 of canvas or other material. This sack is provided with straps 35 so that the same may be conveniently carried on the shoulders of the operator.

When the device just described is to be put into operation, the operator fills sack 34 with a fertilizer appropriate to the particular soil in question and the particular type of seeds to be planted. Thereafter the sack is suitably attached by straps 35 to the shoulders of the operator for support thereby. The planter itself is carried by handle 11, while the other hand may be free for transporting a bucket or sack of seeds, particularly in the case of cut seed potatoes. The soil, prior to planting is, of course, cultivated and the planting operation is commenced by dropping a seed or seeds into the chute 10. Because of covering member 15, the seed will lodge near the end of shovel member 14 as can be readily seen from Figure 1. Prior or subsequent to placing the seed near the discharge end of the chute, a predetermined bulk of fertilizer may be inserted in the seed chute. This is done by gripping handle 11 and the free end of rod 29 to draw the latter toward the former one or more times. Fertilizer in predetermined amounts will then be dispensed into a position either above or below the seed depending upon the time of actuation of valve 29. Thereafter, the operator still gripping handle 11, jabs shovel 14 into the ground, using step 22 to apply the necessary force. During this operation, closing plate 15 is kept in closed position by studs 18. When the shovel and cover plate have been inserted a sufficient distance into the ground the entire chute 10 is swung forward from the operator from the position shown in Figure 1 to the position shown in Figure 2. As this occurs, member 20 strikes the surface of the soil and causes bolts 16 to slide upwardly in slot 17 of shovel 14. Thus, pins are located above the edge of shoulder 19 of shovel 14 so that plate 15 may swing freely about bolts 16 as an axis. The movement is stopped by studs 18 striking against the upper edge of shovel 14 (see Figure 2). Of course, when cover plate 15 and shovel 14 are in the position of Figure 2, all of the material, seeds and fertilizer is discharged into the earth. The entire apparatus is then lifted upwardly and the operation repeated at the next planting zone.

Having now described in detail a preferred type of hand planting device constructed according to this invention, it is understood that variations may be made without departing from the spirit of the invention or the scope of the appended claim.

What is claimed is:

A fertilizer dispenser for use with a planting device of the type used in planting seed potatoes and the like, including a seed chute, pivoted jaws constituting a soil penetrating digging element connected at one end of said seed chute, said jaws being normally closed and in that position normally closing off one end of said chute, a handle attached adjacent the other end of said chute, means for opening said jaws in sub-soil surface position, a rigid fertilizer conduit connected to said chute, one end of said rigid conduit discharging into the chute, a flexible conduit attached to the other end thereof, a fertilizer container connected to the free end of said flexible conduit, said container being adapted to be supported by the body of the operator, a normally closed measuring valve disposed in the first-named conduit, and means adjacent the handle of the chute for actuating said measuring valve independently of said pivoted jaws, whereby fertilizer may be discharged in any desired relationship with respect to the seed.

BUIRL BAER.